April 1, 1958     SABURO MURAKAMI     2,828,671
WIDE APERTURE PHOTOGRAPHIC OBJECTIVES
Filed Jan. 3, 1957
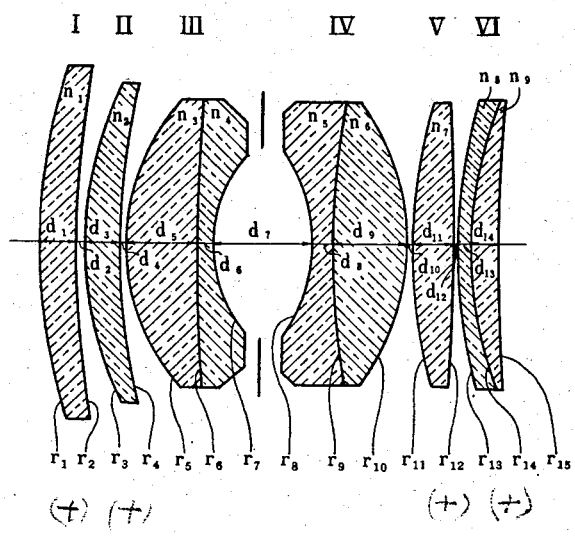
INVENTOR.
SABURO MURAKAMI
BY
ATTORNEY

United States Patent Office 2,828,671
Patented Apr. 1, 1958

2,828,671

WIDE APERTURE PHOTOGRAPHIC OBJECTIVES

Saburo Murakami, Kawasaki City, Japan, assignor to Nippon Kogaku K. K., Tokyo, Japan, a corporation of Japan Application January 3, 1957, Serial No. 632,339

Claims priority, application Japan April 10, 1956

3 Claims. (Cl. 88—57)

The instant invention relates to wide aperture photographic objectives.

It is an object of the instant invention to provide a wide aperture photographic objective of superb photographic power, comprising six components consisting of nine lens elements.

The figure of the attached drawing illustrates an embodiment of the objective according to this invention of which the third and the fourth components each consists of a pair of cemented lenses.

In the photographic objective according to this invention, the first component I, that is, the first lens element, and the second component II, that is, the second lens element, are each a positive meniscus lens with its convex surface towards the object. The third component III is a cemented meniscus lens consisting of the third lens element, a single convex lens and the fourth lens element, a single concave lens, the convex outer surface of the cemented third component facing towards the object. The fourth component IV is a cemented meniscus lens consisting of the fifth lens element, a single concave lens, and the sixth lens element, a single convex lens, the convex outer surface of the cemented fourth component facing towards the image plane. The fifth component V, that is, the seventh lens element, is a single convex lens. The sixth component VI is a cemented positive meniscus lens comprising the eighth lens element, a single concave lens, and the ninth lens element, a single convex lens, the convex outer surface of the sixth component facing towards the object.

The respective absolute value of the focal length of each component is designed to be not less than $1.1\ f$ and to minimize the individual portions of various aberrations, in which $f$ denotes the resulting focal length of the objective composed of the above lenses. Stated more particularly, by making $$1.69 < n_3,\ 40 < v_3 < 55$$
$$0.45\ f < r_5 < 0.60\ f,\ 0.25\ f < r_7 < 0.40\ f$$

and observing the relation of $n_3 > n_4$, mainly coma and astigmatic aberration can be minimized, where $r_{\text{subscript}}$ is the radius of curvature of the successive refractive surfaces of the objective, $n_{\text{subscript}}$ the refractive index on the d-line of the glass of the successive lenses, and $v_{\text{subscript}}$ the Abbe number, representative of the dispersive power, of the glass of successive lenses, the subscripts increasing from the object to the image side of the objective. Furthermore by making:

$$1.70 < n_6,\ 37 < v_6 < 55$$
$$0.35\ f < |r_8| < 0.50\ f,\ 0.50\ f < |r_{10}| < 0.65\ f$$

and by observing the relation of $n_6 > n_5$, coma can be minimized. By choosing $0.20\ f < d_7 < 0.35\ f$, curvature of field can be minimized.

By the above mentioned design, superb photographic objectives of F:1.1 with the minima of chromatic aberration, spherical aberration, coma, astigmatic aberration and curvature of field, for a field angle of 46° can be obtained.

*Example*

The illustrative embodiment according to this invention illustrated in the sole figure of the attached drawing has the following detailed characteristics:

$$[f=100 \quad F=1.1 \quad 46°]$$

| Focal Length of Component | Radius | Axial Thickness and Separation | Refractive Index | Abbe Number |
|---|---|---|---|---|
| $f_\text{I} = +447.7$ | $r_1 = +167.6$ | $d_1 = 8.7$ | $n_1 = 1.6073$ | $v_1 = 59.5$ |
|  | $r_2 = +428.3$ | $d_2 = 0.6$ |  |  |
| $f_\text{II} = +338.9$ | $r_3 = +93.0$ | $d_3 = 8.5$ | $n_2 = 1.6073$ | $v_2 = 59.5$ |
|  | $r_4 = +163.8$ | $d_4 = 1.4$ |  |  |
|  | $r_5 = +53.5$ | $d_5 = 19.4$ | $n_3 = 1.7170$ | $v_3 = 47.9$ |
| $f_\text{III} = -823.7$ | $r_6 = +872.1$ | $d_6 = 4.1$ | $n_4 = 1.5927$ | $v_4 = 35.4$ |
|  | $r_7 = +33.3$ | $d_7 = 25.2$ |  |  |
|  | $r_8 = -42.6$ | $d_8 = 5.4$ | $n_5 = 1.6483$ | $v_5 = 33.8$ |
| $f_\text{IV} = +2309.5$ | $r_9 = +135.7$ | $d_9 = 20.5$ | $n_6 = 1.7170$ | $v_6 = 47.9$ |
|  | $r_{10} = -58.1$ | $d_{10} = 0.6$ |  |  |
|  | $r_{11} = +116.3$ | $d_{11} = 11.0$ | $n_7 = 1.7170$ | $v_7 = 47.9$ |
| $f_\text{V} = 162.2$ | $r_{12} = \infty$ | $d_{12} = 0.6$ |  |  |
|  | $r_{13} = +142.3$ | $d_{13} = 2.9$ | $n_8 = 1.6259$ | $v_8 = 35.6$ |
| $f_\text{VI} = 300.2$ | $r_{14} = +96.9$ | $d_{14} = 7.8$ | $n_9 = 1.6385$ | $v_9 = 55.5$ |
|  | $r_{15} = +518.0$ |  |  |  | where $r_{\text{subscript}}$, $n_{\text{subscript}}$ and $v_{\text{subscript}}$ are as above stated, $d_{\text{subscript}}$ is the thickness of the successive lenses and the distance of the successive spacings at the optical axis, the subscripts likewise increasing from the object to the image side of the objective, and a surface which is convex to the incident light has a positive radius of curvature and a concave surface has a negative radius of curvature.

It will be noted that the lenses of each the third and fourth components of the objective of my invention may be slightly separated from each other rather than be intercemented as shown in the figure.

What I claim is:

1. A wide aperture photographic objective comprising six aligned and spaced components consisting of a total of nine lens elements, of which the first component is a first positive meniscus lens with its convex surface towards the object side of the objective, the second component is a second positive meniscus lens with its convex surface to the object side, the third component is a cemented meniscus component consisting of a first convex lens and a first concave lens, the convex outer surface of the third component facing towards the object side, the fourth component is a cemented meniscus component consisting of a second concave lens and a second convex lens, the convex outer surface of the fourth component facing towards the image side of the objective, the fifth component is a single positive lens, the sixth component is a cemented positive meniscus component consisting of a third concave lens and a third convex lens, the convex outer surface of the sixth component facing the object side, each component has a focal length of an absolute value not less than one-tenth in excess of the total focal length of the objective, the index of refraction of the first convex lens is greater than 1.69 and greater than the index of refraction of the first concave lens, the Abbe number of the first convex lens lies between 40 and 55, the outer convex surface of the third component has a radius of curvature of from $0.45\ f$ to $0.60\ f$, the outer concave surface of the third component has a radius of curvature of from 0.25 $f$ to 0.40 $f$, the index of refraction of the second convex lens is greater than 1.70 and greater than that of the second concave lens, the radius of curvature of the outer concave surface of the fourth component has an absolute value lying between 0.35 $f$ and 0.50 $f$, the outer convex surface of the fourth component has a radius of curvature of an absolute value lying between 0.50 $f$ and 0.65 $f$, the Abbe number of the second convex lens lies between 37 and 55, and the axial distance from the outer concave surface of the third component to the outer concave surface of the fourth component lies between 0.20 $f$ and 0.35 $f$, where $f$ is the total focal length of the objective.

2. A wide aperture photographic objective comprising six aligned and spaced components consisting of a total of nine lens elements of which the first component is a positive meniscus lens of which the convex surfaces faces the object side of the objective, the second component is a second positive meniscus lens of which the convex surface faces the object side, the third component is a meniscus array consisting of a first convex lens closely spaced from a first concave lens in the direction to the image side of the objective, the convex outer surface of the third component facing towards the object side, the fourth component is a meniscus array consisting of a second concave lens closely spaced from a second convex lens in the direction to the image side of the objective, the convex outer surface of the fourth component facing towards the image side, the fifth component is a single positive lens, the sixth component is a cemented positive meniscus component consisting of a third concave lens and a third convex lens, the convex outer surface of the sixth component facing the object side, each component has an individual focal length which is at least one-tenth greater than the total focal length of the objective, the index of refraction of the first convex lens is greater than 1.69 and greater than of the first concave lens, the index of refraction of the second convex lens is greater than 1.70 and greater than that of the second concave lens, the outer convex surface of the third component has a radius of curvature lying between 0.45 $f$ and 0.60 $f$, the outer convex surface of the fourth component has a radius of curvature of absolute value lying between 0.50 $f$ and 0.65 $f$, the outer concave surface of the third component has a radius of curvature lying between 0.25 $f$ and 0.40 $f$, the radius of curvature of the outer concave surface of the fourth component is of an absolute value lying between 0.35 $f$ and 0.50 $f$, the Abbe number of the first convex lens lies between 40 and 55, the Abbe number of the second convex lens lies between 37 and 55, and the axial distance from the outer concave surface of the third component to the outer concave surface of the fourth component lies between 0.20 $f$ and 0.35 $f$, where $f$ is the total focal length of the objective.

3. A wide aperture photographic objective having the following numerical data:

[Focal length $f=100$    F : 1.1    Field angle 46°]

| Focal Length of Component | Radius | Axial Thickness and Separation | Refractive Index | Abbe Number |
|---|---|---|---|---|
| $f_I = +447.7$ | $r_1 = +167.6$ | $d_1 = 8.7$ | $n_1 = 1.6073$ | $v_1 = 59.5$ |
|  | $r_2 = +428.3$ | $d_2 = 0.6$ |  |  |
| $f_{II} = +338.9$ | $r_3 = + 93.0$ | $d_3 = 8.5$ | $n_2 = 1.6073$ | $v_2 = 59.5$ |
|  | $r_4 = +163.8$ | $d_4 = 1.4$ |  |  |
|  | $r_5 = + 53.5$ | $d_5 = 19.4$ | $n_3 = 1.7170$ | $v_3 = 47.9$ |
| $f_{III} = -823.7$ | $r_6 = +872.1$ | $d_6 = 4.1$ | $n_4 = 1.5927$ | $v_4 = 35.4$ |
|  | $r_7 = + 33.3$ | $d_7 = 25.2$ |  |  |
|  | $r_8 = - 42.6$ | $d_8 = 5.4$ | $n_5 = 1.6483$ | $v_5 = 33.8$ |
| $f_{IV} = 2309.5$ | $r_9 = +135.7$ | $d_9 = 20.5$ | $n_6 = 1.7170$ | $v_6 = 47.9$ |
|  | $r_{10} = - 58.1$ | $d_{10} = 0.6$ |  |  |
|  | $r_{11} = +116.3$ |  |  |  |
| $f_V = 162.2$ |  | $d_{11} = 11.0$ | $n_7 = 1.7170$ | $v_7 = 47.9$ |
|  | $r_{12} = \infty$ | $d_{12} = 0.6$ |  |  |
|  | $r_{13} = +142.3$ | $d_{13} = 2.9$ | $n_8 = 1.6259$ | $v_8 = 35.6$ |
| $f_{VI} = 300.2$ | $r_{14} = + 96.9$ | $d_{14} = 7.8$ | $n_9 = 1.6385$ | $v_9 = 55.5$ |
|  | $r_{15} = +518.0$ |  |  |  |

References Cited in the file of this patent

UNITED STATES PATENTS

| | | |
|---|---|---|
| 2,319,171 | Warmisham et al. | May 11, 1943 |
| 2,379,392 | Warmisham | June 26, 1945 |
| 2,701,982 | Angenieux | Feb. 15, 1955 |
| 2,735,339 | Yoshikazu | Feb. 21, 1956 |

FOREIGN PATENTS

| | | |
|---|---|---|
| 565,566 | Germany | Dec. 2, 1932 |
| 1,077,189 | France | Apr. 28, 1954 |